(12) United States Patent  (10) Patent No.: US 7,558,160 B2
Yoshimoto et al.  (45) Date of Patent: Jul. 7, 2009

(54) DEMODULATION OF A FOCUSING ERROR SIGNAL DURING A FOCUS SEARCH FOR A LENS FOCUSING CONTROL IN AN OPTICAL DISC SYSTEM

(75) Inventors: Ainobu Yoshimoto, Milpitas, CA (US); Hyun-Gyu Jeon, Pleasanton, CA (US); Yuan Zheng, Newark, CA (US)

(73) Assignee: LSI Corporation, Milpitas, CA (US)

( * ) Notice: Subject to any disclaimer, the term of this patent is extended or adjusted under 35 U.S.C. 154(b) by 568 days.

(21) Appl. No.: 11/152,554

(22) Filed: Jun. 14, 2005

(65) Prior Publication Data

US 2006/0280104 A1    Dec. 14, 2006

(51) Int. Cl.
*G11B 7/00* (2006.01)
(52) U.S. Cl. ................... 369/44.11; 369/53.23
(58) Field of Classification Search .......... None
See application file for complete search history.

(56) References Cited

U.S. PATENT DOCUMENTS

| 4,998,234 | A | * | 3/1991 | Rees et al. | 369/44.27 |
| 5,675,561 | A | * | 10/1997 | Yoshioka | 369/44.25 |
| 6,633,522 | B2 | | 10/2003 | Ryu | |

* cited by examiner

*Primary Examiner*—Joseph Feild
*Assistant Examiner*—Joseph Haley
(74) *Attorney, Agent, or Firm*—Christopher P. Maiorana, PC

(57) ABSTRACT

A method for demodulating a focusing error signal in an optical disc system, comprising the steps of (A) generating a beam strength signal and the focusing error signal, (B) sampling the beam strength signal and the focusing error signal at an appropriate sampling rate, (C) removing a static offset from the beam strength signal and the focusing error signal, (D) calibrating a peak-to-peak value of the beam strength signal and the focusing error signal, and (E) determining an appropriate phase to (i) demodulate the focusing error signal and (ii) calculate a vertical position of a lens in relation to a disc.

15 Claims, 7 Drawing Sheets

TRACK DIRECTION

DEMODULATION OF A FOCUSING ERROR SIGNAL DURING A FOCUS SEARCH FOR A LENS FOCUSING CONTROL IN AN OPTICAL DISC SYSTEM

FIELD OF THE INVENTION

The present invention relates to an optical storage system generally and, more particularly, to a method and/or apparatus for implementing the demodulation of a focusing error signal during a focus search for a lens focusing control in an optical disc system.

BACKGROUND OF THE INVENTION

In a conventional optical disc system, to sense the position of the laser beam in relation to the track on the disc, a main laser beam creates a reflection from the disc. The reflection is typically picked up by 4 photo-diode sensors. FIG. 1 is a conceptual diagram illustrating how such a photo-diode configuration is laid out in relation to the track direction. The outputs of the 4 photo-diodes (when the laser beam is focused on the disc) are shown as signals A, B, C and D, respectively.

Referring to FIG. 2, a conventional optical disc system 20 is shown. The system 200 keeps a laser beam 22 focused on the surface of an optical disc 23. A focusing actuator (not shown) is used to move an objective lens 24 upwards and downwards. The vertical position information of the lens 24 in relation to the optical disc 23 (while moving the objective lens 24 in a vertical direction) is important for motion feedback control of the focusing actuator.

Referring to FIG. 3, a diagram illustrating a conventional focus control zone is shown. When the focus point of the laser beam 22 is moving close to the surface of the optical disc 23, an "S-curve" may be seen in the signal FE and a peak may be seen in the signal BS. A zone Z may creates a focus control zone to turn on the lens focus motion controller. The focus control zone controls the focusing actuator to "lock" the objective lens 24 at the vertical position when the focus point of the laser beam 22 is staying on the data surface of the optical disc 23.

With conventional control methods, a high sampling rate controller (not shown) is needed to quickly focus the laser beam 22 on the data surface of the disc 23 which has multiple optical tracks 26a-26n. The vertical motion of the lens 24 is controlled by the focusing actuator. However, such a high sampling rate controller is generally expensive to implement.

Conventional approaches can only detect the vertical position of the laser beam 22 when the focus point of the laser beam 22 is very close to the surface of the disc 23. The vertical position of the laser beam 22 can be detected by using a very high sampling rate on a focusing error signal FE and a beam strength signal BS. A low sampling rate controller cannot be implemented with conventional methods because the low sampling rate controller generally misses focus point timing. Such focus point timing issues are particularly apparent when the disc 23 has a high vertical deviation while rotating at a high speed.

Because low sampling rate controllers cannot be implemented in conventional approaches, high sampling rate controllers have been found acceptable in reliably searching for the focus point of the laser beam 22. In particular, high sampling controllers reliably direct the focus point of the laser beam 22 to the surface of the disc 23. However, high sampling rate controllers are expensive and are generally more complex to implement, particularly in a software solution.

It would be desirable to provide a method and/or apparatus to obtain the lens vertical position information during a focus search motion from the signal FE with a low sampling rate controller. It would also be desirable to (i) quickly detect the vertical position of the focus point of a laser beam in relation with the surface of a disc as the focus point is moved closer to the disc, (ii) implement an inexpensive low sampling rate controller to control the focusing actuator to successfully search a focus point, and/or (iii) focus the laser beam on the surface of the optical disc, even as the disc rotates with a high vertical deviation at a high speed.

SUMMARY OF THE INVENTION

The present invention concerns a method for demodulating a focusing error signal in an optical disc system, comprising the steps of (A) generating a beam strength signal and the focusing error signal, (B) sampling the beam strength signal and the focusing error signal at an appropriate sampling rate, (C) removing a static offset from the beam strength signal and the focusing error signal, (D) calibrating a peak-to-peak value of the beam strength signal and the focusing error signal, and (E) determining an appropriate phase to (i) demodulate the focusing error signal and (ii) calculate a vertical position of a lens in relation to a disc.

The objects, features and advantages of the present invention include providing a method and/or apparatus that may (i) allow a low sampling rate controller to search a focus point on one or more layers of a disc reliably, (ii) implement a low sampling rate controller in a conventional method while the disc rotates at a high speed with a high vertical deviation and/or (iii) provide a cost effective system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
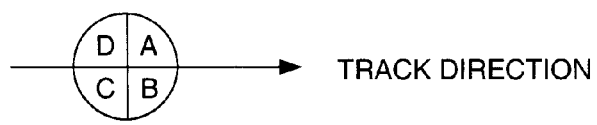
FIG. 1 illustrates a photo-diode sensor distribution system.
Figure 2:
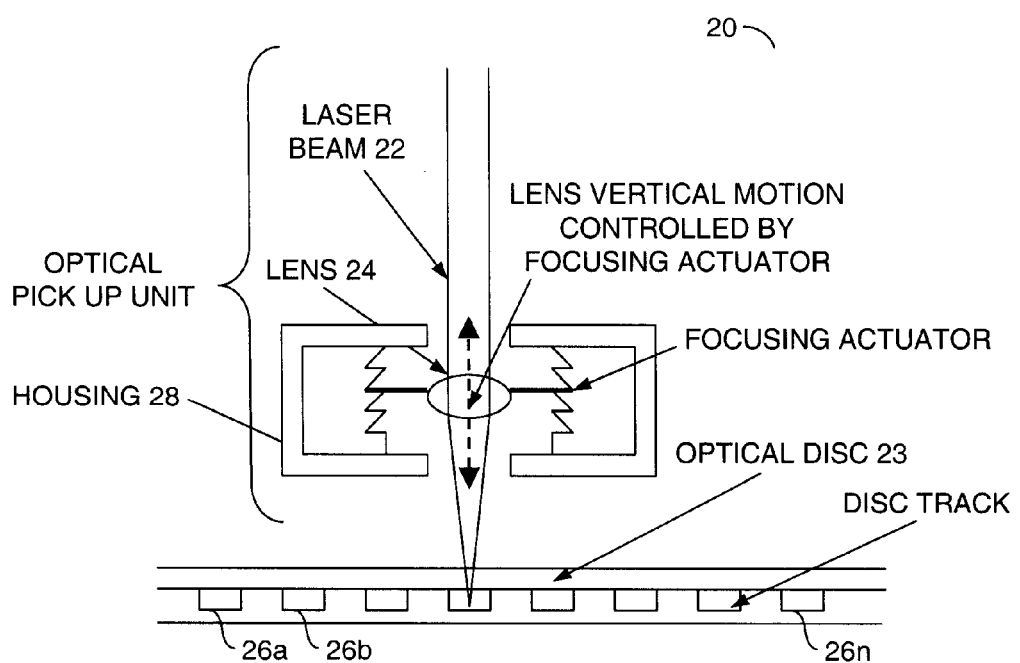
FIG. 2 illustrates a lens and a lens housing in relation to a position of a laser beam.
Figure 3:
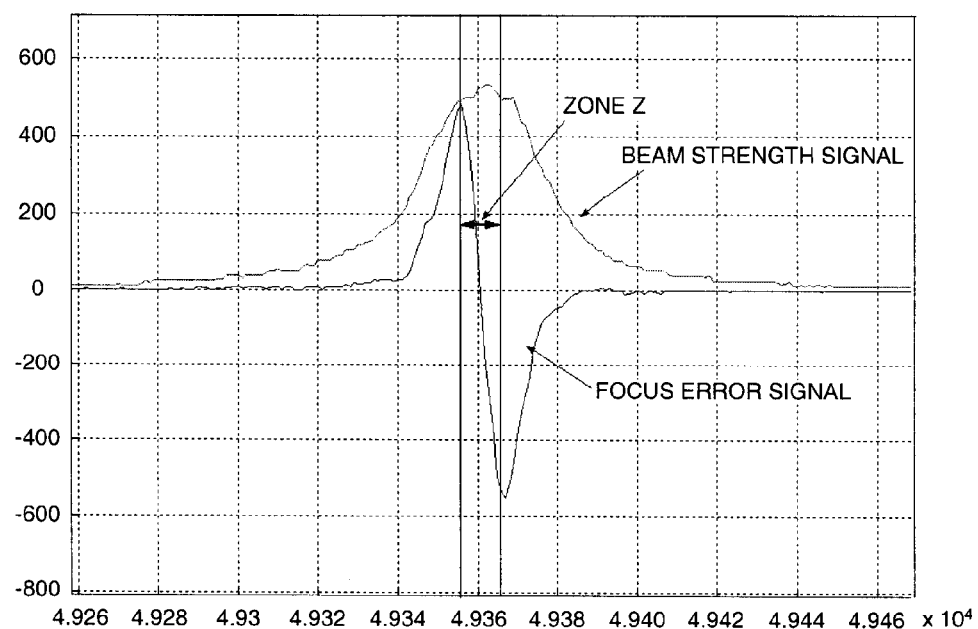
FIG. 3 is a diagram of a conventional focus control zone.
Figure 4:
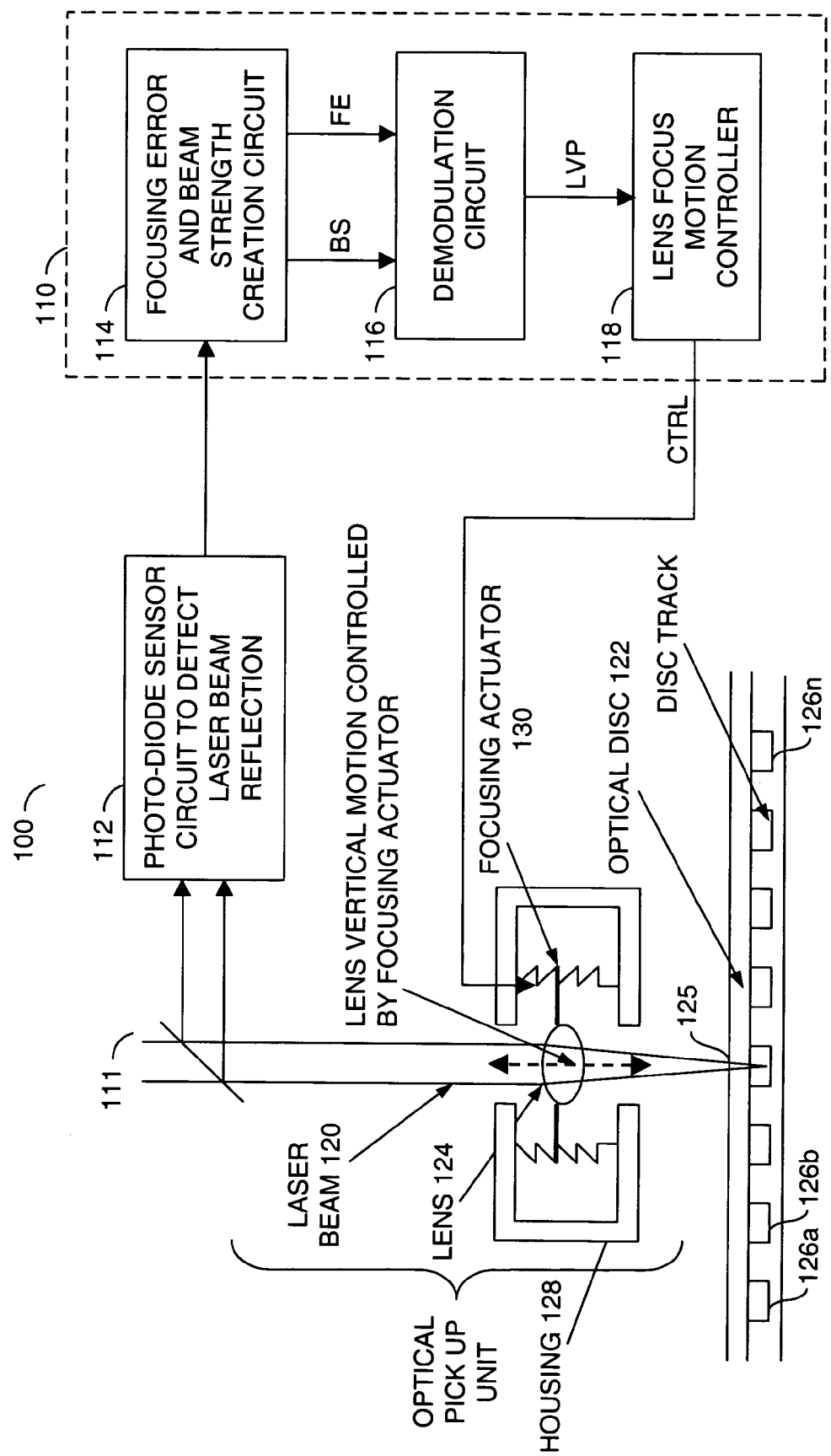
FIG. 4 is a diagram of a system incorporating the present invention.

Referring to FIG. 4, a diagram of a system 100 in accordance with a preferred embodiment of the present invention is shown. The system 100 generally comprises a control circuit 110, a lens housing portion 111, a photo distribution portion 112, a laser beam 120 and an optical disc 122. The system 100 generally controls the focus of the laser beam 120 in relation to the optical disc 122. The control circuit 110 generally comprises a block (or circuit) 114, a block (or circuit) 116, and a block (or circuit) 118. The circuit 114 may be implemented as a creation circuit. The circuit 116 may be implemented as a demodulation circuit. The circuit 118 may be implemented as a controller. The creation circuit 114 may present one or more signals (e.g., FE and BS) to the demodulation circuit 116. The signal FE may be a focusing error signal. The signal BS may be a beam strength signal. The demodulation block (or circuit) 116 may present a signal (e.g., LVP). The controller 118 may be implemented as a lens focus motion controller. A focusing actuator 130 may receive a control signal (e.g., CTRL) from the lens focus motion controller 118.

The focusing actuator 130 may move an objective lens 174 vertically to direct a focus point 125 of the laser beam 122 over the surface of the optical disc 122 and over a particular one of a number of physical tracks 126a-126n. In general, the signals FE and BS may be used to sense the lens 124 and/or the vertical position of the laser beam 120.

Figure 5:
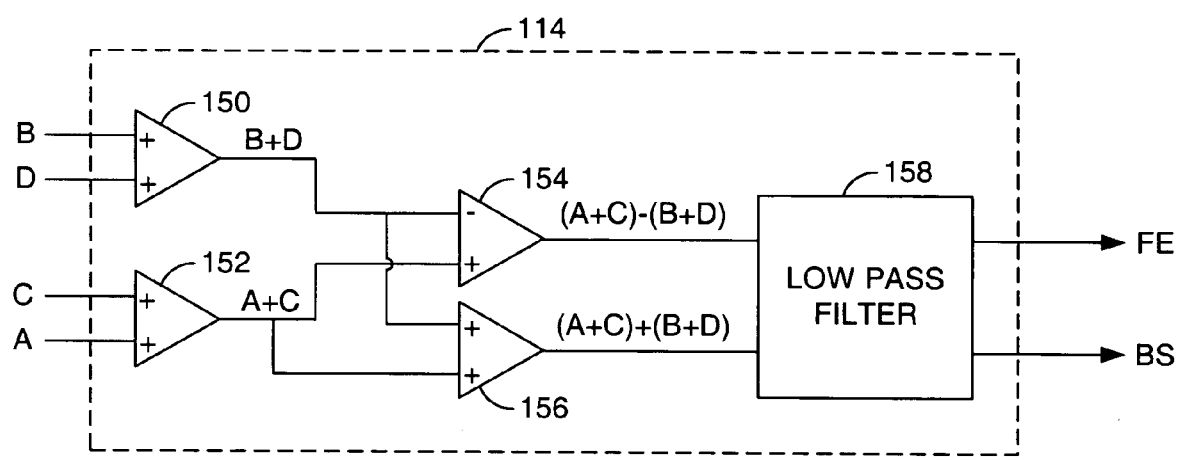
FIG. 5 is a diagram of the creation circuit of the signal focusing error and the signal beam strength.

Referring to FIG. 5, a more detailed diagram of the creation circuit 114 is shown. The creation circuit 114 generally comprises a circuit 150, a circuit 152, a circuit 154, a circuit 156 and a circuit 158. The circuit 150, the circuit 152 and the circuit 156 may be implemented as summing circuits. The circuit 154 may be implemented as a differential circuit (e.g., a comparator, etc.). The circuit 158 may be implemented as a low pass filter. In general, the circuit 150 receives the signal B and the signal D and presents a signal equal to B+D. Similarly, the circuit 152 receives the signal A and the signal C and presents an output signal equal to A+C. The differential circuit 154 receives the signal A+C and the signal B+D and presents a signal equal to (A+C)−(B+D). The signal (A+C)−(B+D) may be presented to the low pass filter 158, which generates the signal FE. The summing circuit 156 receives the signal (A+C) and the signal (B+D) and presents a signal equal to (A+C)+(B+D). The signal (A+C)+(B+D) may be presented to the low pass filter 158, which generates the signal BS.

Figure 6:
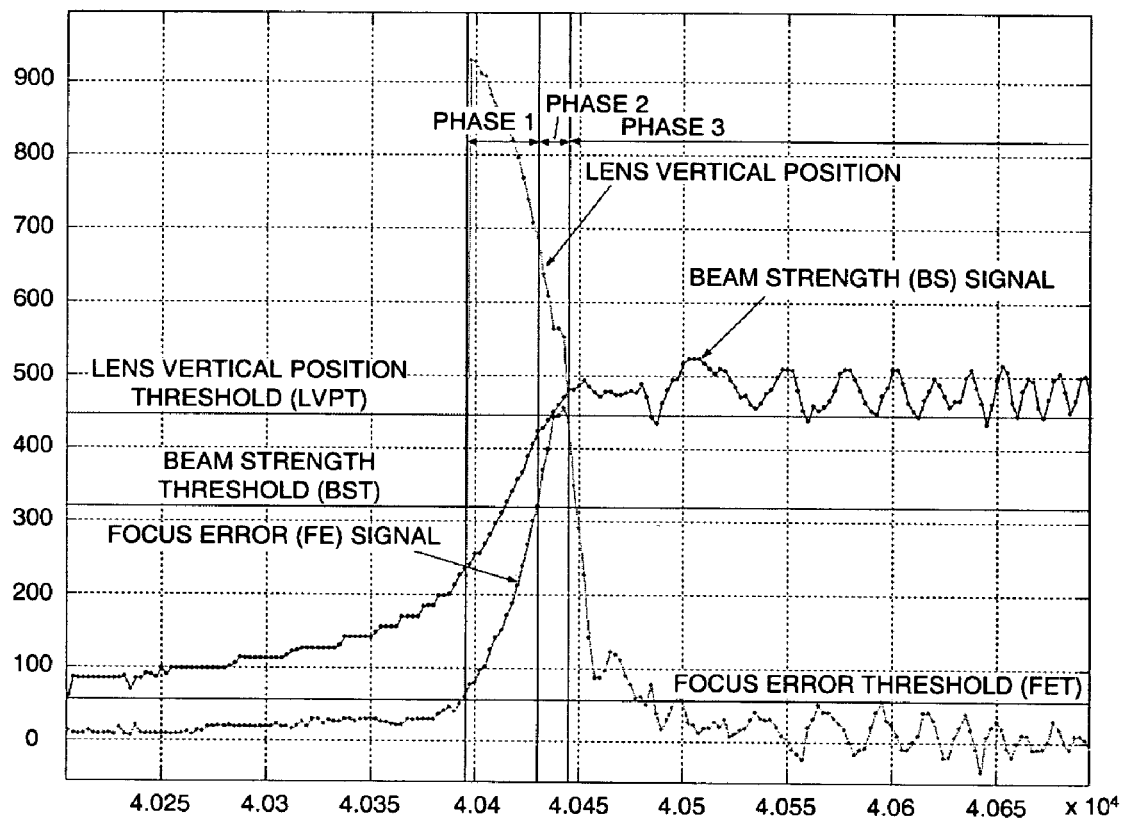
FIG. 6 is a diagram of a focus control zone according to the present invention.

Referring to FIG. 6, a diagram of a focus control zone in accordance with the present invention is shown. In general, the signal FE may be divided into a first phase (e.g., phase 1), a second phase (e.g., phase 2) and a third phase (e.g., phase 3). The vertical position of the lens 124 may be demodulated based on the particular phase of the signal FE (to be described in more detail in relation to FIG. 8).

Figure 7:
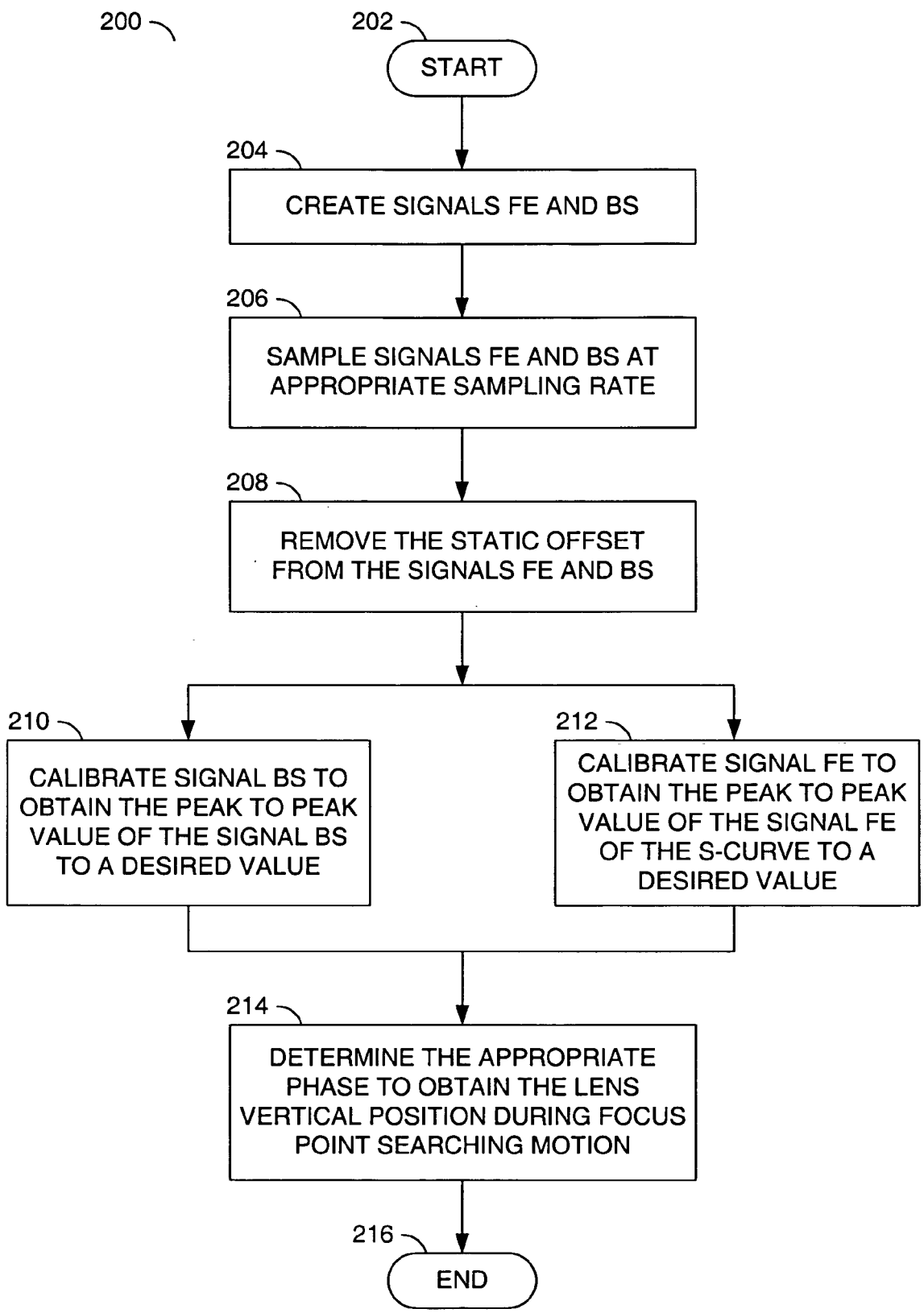
FIG. 7 is a flow diagram of a process of an embodiment of the present invention.

Referring to FIG. 7, a method 200 is shown in accordance with the present invention. The method 200 generally comprises a state (or step) 202, a state (or step) 204, a state (or step) 206, a state (or step) 208, a state (or step) 210, a state (or step) 212, a state (or step) 214, and a state (or step) 216. The state 202 generally comprises a start state. The state 204 generally comprises creates the signals FE and BS with the creation circuit 114. The state 206 generally samples the signals FE and BS at a sampling rate to be used by the demodulation circuit 116. The state 208 generally removes the static offset from the signals FE and BS. The static offset may be the offset of the signals FE and BS when the laser beam 120 is turned off. The state 210 generally calibrates the signal BS to obtain the peak-to-peak value of the signal BS to a desired design value. The step 212 generally calibrates the signal FE to obtain the peak-to-peak value of the signal FE (e.g., FEpp) of the S-curve to a desired value. A calibration of the offset and the gain of the signals FE and BS may include the steps of removing the static offset from the signals FE and BS and obtaining the peak-to-peak value of the signals FE and BS.

Figure 8:
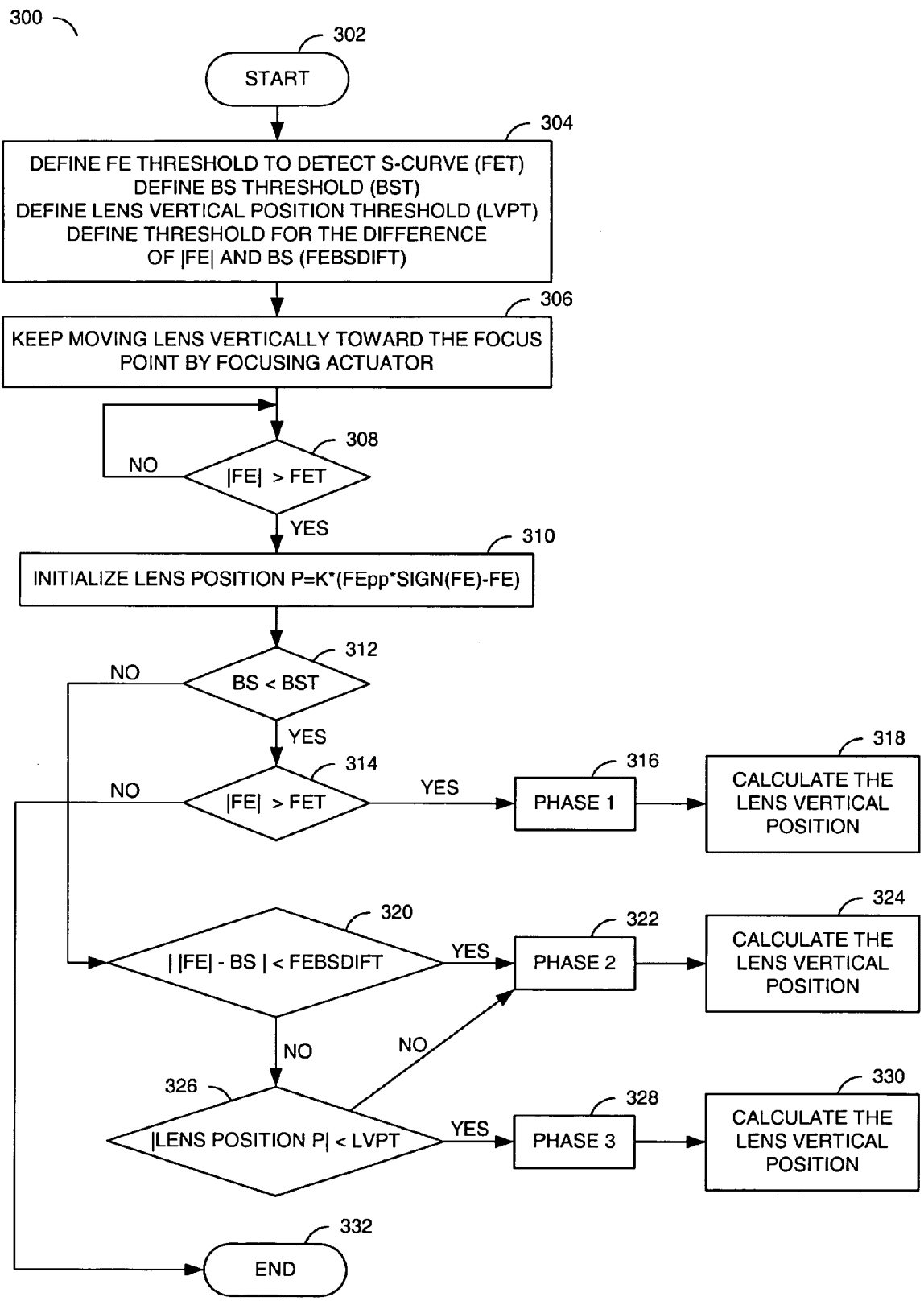
FIG. 8 is a flow diagram of a method illustrating various phases of an embodiment of the present invention.

Referring to FIG. 8, a method 300 is shown. The method 300 may demodulate the signal FE to obtain the lens vertical position. The method 300 generally comprises a state (or step) 302, a state (or step) 304, a state (or step) 306, a decision state (or step) 308, a state (or step) 310, a decision state (or step) 312, a decision state (or step) 314, a state (or step) 316, a state (or step) 318, a decision state (or step) 320, a state (or step) 322, a state (or step) 324, a decision state (or step) 326, a state (or step) 328, a state (or step) 330, a state (or step) 332. The state 302 comprises a start state. The state 304 generally defines (i) the threshold of the signal FE to detect S-curve (e.g., FET), (ii) the threshold of a threshold signal (e.g., BST), (iii) the lens vertical position threshold (e.g., LVPT), and (iv) the Threshold for the difference of the absolute value of signal FE and the value of signal BS (e.g., FEBSDIFT). The state 306 generally starts moving the lens 24 vertically toward the focus point by the focusing actuator 130 and the vertical motion may continue during the whole demodulation process.

The decision state 308 generally determines whether the absolute value of the signal FE is higher than the threshold FET. If the absolute value of the signal FE is higher than the threshold FET, the method 300 moves to the state 310. The state 310 generally initializes the lens vertical position with the following equation EQ1:

$$\text{Lens Vertical Position} = K^*(FEpp^*\text{SIGN}(FE) - FE) \qquad \text{EQ1}$$

where, K is the constant scale factor to convert from a value of the signal FE to the lens vertical position, FEpp is the peak to peak value of the signal FE after calibration when the entire S-curve is detected, and SIGN(FE)=1 if the signal FE is greater than or equal to 0, otherwise the signal FE is the value of −1.

If the absolute value of the signal FE is less than the threshold FET, the method 300 remains in the decision state 308 until the absolute value of the signal FE is greater than the threshold FET. The state 312 generally determines whether the signal BS is less than the BST. If the signal BS is less than the BST, the method 300 moves to the decision state 314. The state 314 generally checks if the absolute value of the signal FE is greater than the threshold FET. If the absolute value of the signal FE is not greater than the threshold FET then the method 300 moves to the step 332 and ends. Otherwise the method 300 moves to the state 316. The state 316 generally enters into phase 1. The state 318 generally calculates the lens vertical position after entering into phase 1 by the following equation EQ2:

$$\text{Lens Vertical Position} = \text{Previous Lens Vertical Position} + K^*(\text{previous } FE - FE) \qquad \text{EQ2}$$

where, the previous Lens Vertical Position is the value of Lens Vertical Position in a previous sampling cycle and the Previous FE is the value of the signal FE in the previous sampling cycle.

In the state 312, if the signal BS is greater or equal to the threshold BST, the method 300 moves to the decision state 320. The state 320 generally determines whether the absolute value of the difference between the signal BS and the absolute value of FE is less than the signal FEBSDIFT. If the absolute value of the difference between the signal BS and the absolute value of the signal FE is less than the signal FEBSDIFT, the method 300 moves to the state 322. The state 322 generally enters into phase 2. The method 300 moves to the state 324 to calculate the lens vertical position while in phase 2. The lens vertical position is calculated according to the following equation EQ3:

$$\text{If (previous } FE - FE)^*FE < 0 \text{ then the Lens Vertical Position} = \text{Previous Lens Vertical Position} + K^*(\text{previous } FE - FE) \qquad \text{EQ3}$$

(e.g., the lens vertical position is calculated by EQ2).

Otherwise, the lens vertical position is calculated according to the following equation EQ4:

$$\text{Lens Vertical Position} = \text{Previous Lens Vertical Position} - K^*(\text{previous } FE - FE) \quad \text{EQ4}$$

If the absolute value of the difference between the signal BS and the absolute value of the signal FE is greater than or equal to the signal FEBSDIFT while in the state 320, the method moves to the decision state 326. The decision state 326 generally determines whether the absolute value of the lens position is less than the threshold LVPT. If the absolute value of the lens position is true, then the method 300 moves to the state 328. The state 328 generally enters into phase 3. The method 300 moves from the state 328 to the state 330. The state 330 generally calculates the lens vertical position while in phase 3. The lens vertical position is calculated by the following equation EQ5:

$$\text{Lens Vertical Position} = K^*FE \quad \text{EQ5}$$

If the absolute value of the lens position is not less than the threshold LVPT, then the method 300 moves to the state 322. The method 300 enters into the phase 2, and while in the phase 2, the lens vertical position is calculated as described above in connection with the state 324.

The present invention may calculate the lens vertical position before the focus point enters into zone Z (as shown in FIG. 6). The lens focus motion controller 118 may start control lens of the vertical motion earlier by slowing down the motion of the lens 124 in phase 1. By slowing the motion of the lens 124, the low sampling rate controller may be able to search the focus point easily even when the disc 122 has a high vertical deviation and rotates at a high speed.

The present invention may provide advantages over conventional solutions that may provide an ultimate solution that may be applicable to next generations of optical drives. The present invention may allow for simple implementation that is sensitive, reliable, has high resolution and may be implemented with a low cost.

The function performed by the flow diagram of FIGS. 7 and 8 may be implemented in hardware, software (firmware) or a combination of hardware and software. The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMS, Flash memory, magnetic or optical cards, or any type of media suitable for storing electronic instructions.

The present invention may be applied for all kind of CD optical discs (e.g., CD-ROM, CD-R, CD-RW, etc.) as well as DVD-ROM, DVD-R, DVD-RW, DVD+R, DVD+RW, DVD-RAM. The present invention may also be applicable to next generation optical discs (e.g., Blue-Ray discs and HD-DVD).

The present invention may be applied to drive the focus point of the laser beam to the read or write surface of the optical disc. The present invention may also be used to switch the focus point of the laser beam from one read or write layer of the optical disc to the other read or write layer of the optical disc. While the invention has been particularly shown and described with reference to the preferred embodiments thereof, it will be understood by those skilled in the art that various changes in form and details may be made without departing from the spirit and scope of the invention.

The invention claimed is:

1. An apparatus for demodulating a focusing error signal in an optical disc system comprising:
   means for generating a beam strength signal and said focusing error signal;
   means for sampling said beam strength signal and said focusing error signal at an appropriate sampling rate;
   means for removing static offset from said beam strength signal and said focusing error signal;
   means for calibrating a peak-to-peak value of said beam strength signal and said focusing error signal;
   means for determining an appropriate phase to (i) demodulate said focusing error signal and (ii) calculate a vertical position of a lens in relation to said optical disc; and
   means for entering into a first phase when said beam strength signal is greater than a beam strength threshold (BST) and a threshold value of the difference between said beam strength signal and an absolute value of said focusing error signal is greater than an absolute value of the difference between said beam strength signal and said absolute value of said focusing error signal.

2. A method for demodulating a focusing error signal in an optical disc system, comprising the steps of:
   (A) generating a beam strength signal and said focusing error signal;
   (B) sampling said beam strength signal and said focusing error signal at an appropriate sampling rate;
   (C) removing a static offset from said beam strength signal and said focusing error signal;
   (D) calibrating a peak-to-peak value of said beam strength signal and said focusing error signal;
   (E) determining an appropriate phase to (i) demodulate said focusing error signal and (ii) calculate a vertical position of a lens in relation to said optical disc; and
   (F) entering into a first phase when said beam strength signal is greater than a beam strength threshold (BST) and a threshold value of the difference between said beam strength signal and an absolute value of said focusing error signal is greater than an absolute value of the difference between said beam strength signal and said absolute value of said focusing error signal.

3. The method according to claim 2, wherein step (E) further comprises the step of:
   defining a focusing error threshold (FET) to detect an S-curve;
   defining a beam strength threshold (BST);
   defining a lens vertical position threshold (LVPT); and
   defining a threshold for a difference between said beam strength signal and an absolute value of said focusing error signal.

4. The method according to claim 3, further comprising the step of:
   moving said lens vertically toward a focus point by a focusing actuator.

5. The method according to claim 4, further comprising the step of:
   initializing said vertical position of said lens.

6. The method according to claim 5, further comprising the step of:
   entering into a first phase when said BST is greater than said beam strength signal and said absolute value of said focusing error signal is greater than said FET.

7. The method according to claim 6, further comprising the step of:
   completing said method when said absolute value of said focusing error signal is less than said FET.

8. The method according to claim 7, further comprising the step of:
   entering into a third phase when an absolute value of a lens position is less than said lens vertical position threshold, wherein said threshold value of the difference between said beam strength signal and said absolute value of said focusing error signal is less than or equal to the absolute value of the difference between said beam strength signal and said absolute value of said focusing error signal.

9. The method according to claim 6, further comprising the step of:
   entering into a second phase when said absolute value of said lens position is greater than said LVPT.

10. The method according to claim 2, wherein step (E) further comprises the step of:
   implementing a low sampling rate controller to search the focus point of a laser beam when said disc is rotating with a high vertical deviation at a high speed.

11. The method according to claim 2, wherein step (D) further comprises the step of:
   generating said static offset when a laser beam is turned off.

12. The method according to claim 2, wherein step (D) further comprises the step of:
   generating said peak-to-peak value of said beam strength signal and said focusing error signal to a desired value.

13. The method according to claim 3, further comprising the step of:
   generating said S-curve of said focusing signal when the focus point of a laser beam moves close to a surface of said optical disc.

14. A computer readable medium configured to execute the steps of claim 2.

15. The method according to claim 2, further comprising the step of:
   entering into a second phase when said BST is greater than said beam strength signal and said absolute value of said focusing error signal is greater than a focusing error threshold (FET).

* * * * *